June 19, 1951 J. H. RAND 2,557,797
RECORD CARD FOR STATISTICAL MACHINES
Filed Nov. 19, 1948
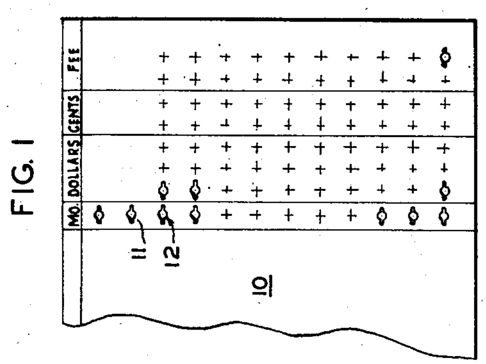
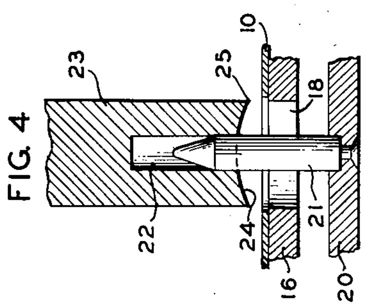
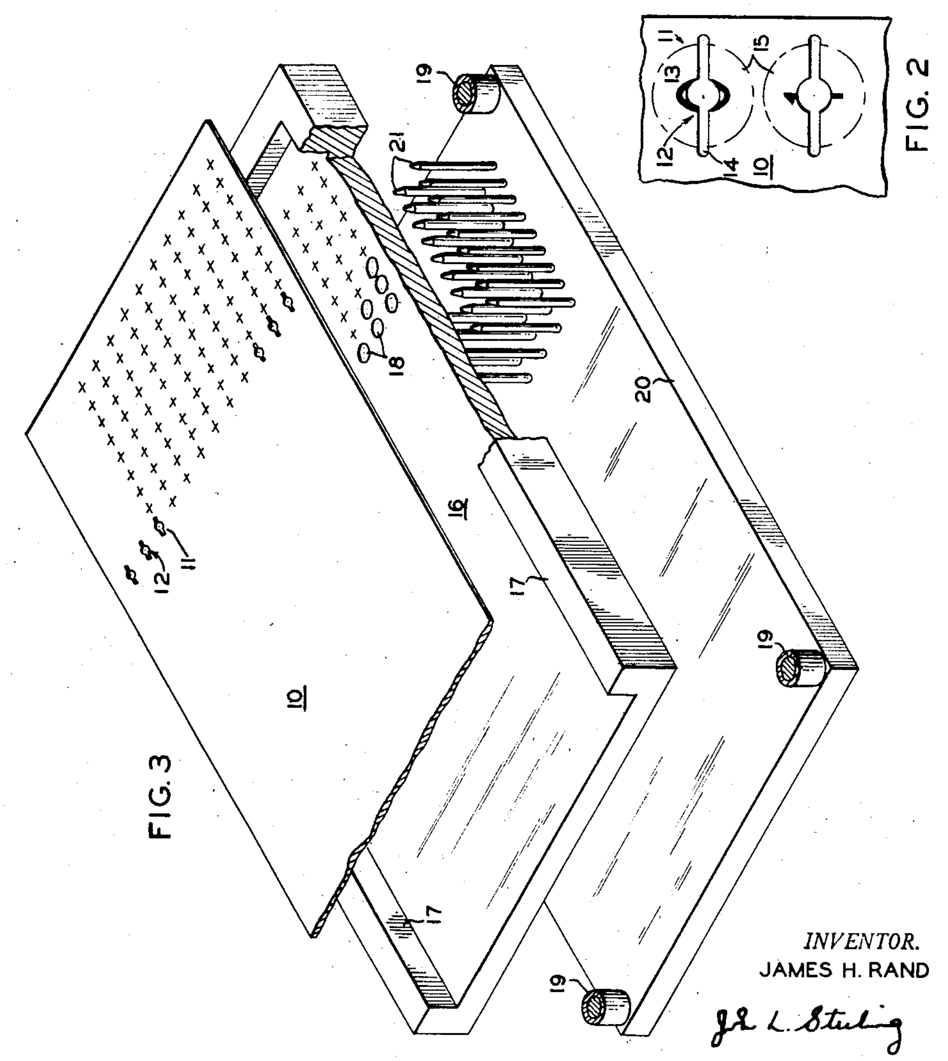
INVENTOR.
JAMES H. RAND
J. L. Sterling
ATTORNEY Patented June 19, 1951 2,557,797

UNITED STATES PATENT OFFICE 2,557,797

RECORD CARD FOR STATISTICAL MACHINES

James H. Rand, Darien, Conn., assignor to Remington Rand Inc., New York, N. Y., a corporation of Delaware Application November 19, 1948, Serial No. 60,870

5 Claims. (Cl. 235—61.12)

This invention relates to the entering of perforated data in record cards, such as those employed with the various Powers statistical machines, and more particularly to an improved record card.

The utilization of systems employing the above mentioned cards has hitherto been shied away from by certain organizations, due to the fact that often the amount of data which they wish to be recorded in the field at various locations does not warrant the use of a perforating machine at each of said locations. This is particularly true in the case of postal money orders wherein it is merely desirous to enter dates, amounts, and fees in a perforated form. Also, other organizations of smaller stature often shun the use of perforated record cards, since the maintenance of even a single perforating machine at a central location would prove financially impractical. This need of manual means for entering perforated data has heretofore been recognized and provided for in the form of various manually operated punches. However, in most instances these punches do not afford the prerequisite degree of accuracy in the disposition of card perforations, which is of paramount importance in any subsequent sensing operation. Experience with certain of said punches also indicates the need of a more certain means for the voidance of card chips therefrom, which chips frequently hinder punching operations and cause time wastage.

Briefly, the present invention consists in a preformed record card which is provided at its index positions with pilot holes having intersecting slots, the pilot holes being provided to receive punch guiding pilot elements and the intersecting slots being effective to divide the punched out card material for thereby preventing accumulations thereof on said pilot elements.

Principally, the present invention contemplates broadening the field in which the hereinabove mentioned perforated record cards are employable.

Another object of the present invention is to provide a novel inexpensively preformed record card adapted for receiving manually entered accurately disposed perforated data.

Another object of the present invention is to provide a preformed record card which will increase the operability of manual punches used therewith.

Other objects and structural details of the invention will be apparent from the following description when read in connection with the accompanying drawing, wherein Fig. 1 is a fragmentary view of a record card having a pre-perforated field;

Fig. 2 is an enlarged fragmentary view of a card illustrating the pre-perforated index positions therein;

Fig. 3 is an exploded isometric view of a card and the apparatus; and

Fig. 4 is a fragmentary sectional view of the apparatus, the card, and a punch in cooperable relation therewith.

As is often the case with record cards in which there is to be entered a small amount of perforated data, a particular field or a certain number of columns are reserved therein for receiving this data. In the card 10, shown in the drawing, a reserved field of eight columns appears at the right end thereof (Fig. 1). However, it is to be understood that such a field may appear anywhere in said card and be of any number of columns. As is also shown in Fig. 1, each card column is provided with index positions 11, one column having twelve, each of which is designative of a month in a year, while the other seven columns are reserved for monetary representations and, therefore, are each provided with but ten index positions 11.

With reference to Fig. 2 it is particularly well seen that the mentioned index positions 11 are provided with pre-perforations 12 comprising relatively small pilot holes 13 and intersecting slots 14, which slots 14 are greater in length than the diameters of normal card perforations, as defined by the broken lines 15.

A component part of one form of apparatus (Fig. 3) employable for operating on the just described record card 10, is a die plate 16, which plate is bounded on three sides by walls 17 integral therewith, and is provided with a plurality of die holes 18 corresponding in number and pattern to the above mentioned card index positions 11.

Fixedly attached to the under side of the die plate 16 and suitably spaced therefrom, as at 19, is a base plate 20 having a plurality of upwardly extending pilot elements 21 suitably secured therein (Figs. 3 and 4). Said elements 21 also correspond in number and pattern to the aforesaid card index positions 11, and all are of sufficient length to pass through the die holes 18, with which they are concentric, and to protrude beyond the top of the die plate 16.

With particular reference to Fig. 4, it is seen that each of said elements 21 is adapted to fit a bore 22 in a hand punch 23, the lower end of which is concave as at 24 for forming a cutting edge 25.

In operation, the card 10 is placed on the die plate 16 and is properly aligned with respect thereto by the abutment of three of its contiguous edges against the aforesaid walls 17, which also tends to axially align the pilot holes 13 with the die holes 18. Thus, the protruding pilot elements 21 are permitted to find and pass through the corresponding pilot holes 13 in the card 10.

The hand punch 23 is then adapted to be fitted selectively over the pilot elements 21, as indicated in Fig. 4, and pressed downwardly for bringing the cutting edge 25 thereof into cooperation with the edges of the die holes 18 to thereby cut the interposed card 10 on the aforesaid defining lines 15. In this manner, and in consequence of the pre-centering effect of the pilot elements 21 fitting in the punch bore 22, accurately disposed data perforations are entered in the card 10. Also, the aforementioned slots 14 are effective for causing two chips rather than a circlet to be cut from each of the punched index positions 11. In this form the chips are readily voided through a mere tilting of the apparatus and, therefore, do not hamper the operability of said apparatus or cause time wastage, as would the accumulation of circlets on the pilot elements 21 and the resultant fouling thereof.

While there is above described but one embodiment of the invention, it is possible to produce still other embodiments without departure from the inventive concept above disclosed, and it is, therefore, desired that only such limitations shall be imposed on the appended claims as are stated therein, or required by the prior art.

What I claim as new, and desire to secure by Letters Patent, is:

1. A record card for controlling statistical machines, having a plurality of index positions, a perforation within each of said index positions, and a slot intersecting each of said perforations and dividing said index positions.

2. A card adapted to be punched with index perforations for use in card controlled machines and having in an index field thereof index positions predefined by pilot holes of a diameter substantially less than that of the index perforations to be punched, and slots intersecting said pilot holes and of a length substantially greater than the diameter of said index perforations.

3. A card for controlling statistical machines, having a plurality of index positions adapted to be punched out for the indication of data therein, a plurality of perforations disposed in said index positions, and slots intersecting said perforations and dividing the card material to be punched out.

4. A record card for controlling the operation of tabulating machines, including a card field having a plurality of index positions adapted to be removed by punching means guided by upright pilot elements, a plurality of perforations located in said positions for associating with said pilot elements, and slots intersecting said plurality of perforations and dividing the material punched from each of said index positions to prevent the accumulation thereof on said pilot elements.

5. A record card for controlling the operation of tabulating machines, having a plurality of index positions adapted to be removed by a punching means guided by upright pilot elements, a plurality of pilot perforations located in said positions for associating with said pilot elements and being diametrically smaller than the perforations to be punched, and slots intersecting said pilot perforations and being greater in length than the diameter of said perforations to be punched for dividing the card material to be punched out of each of said index positions and thereby preventing the accumulation thereof on said pilot elements.

JAMES H. RAND.

REFERENCES CITED

The following references are of record in the file of this patent:

UNITED STATES PATENTS

| Number | Name | Date |
|---|---|---|
| 1,259,551 | Parker and Keet | Mar. 19, 1918 |
| 1,312,067 | Webster | Aug. 5, 1919 |
| 1,778,155 | Hildreth | Oct. 14, 1930 |
| 1,871,597 | English | Aug. 16, 1932 |
| 2,054,811 | Goerlitz | Sept. 22, 1936 |
| 2,237,069 | Christenson | Apr. 1, 1941 |
| 2,268,434 | Tauschek | Dec. 30, 1941 |
| 2,307,617 | Braun | Jan. 5, 1943 |